July 14, 1931.  H. W. BODE  1,814,238
WAVE FILTER
Filed April 12, 1930  3 Sheets-Sheet 1

INVENTOR
H. W. BODE
BY
G. H. Stevenson
ATTORNEY

July 14, 1931.  H. W. BODE  1,814,238
WAVE FILTER
Filed April 12, 1930   3 Sheets-Sheet 2

INVENTOR
H.W. BODE
BY
G. H. Stevenson
ATTORNEY

July 14, 1931.  H. W. BODE  1,814,238
WAVE FILTER
Filed April 12, 1930   3 Sheets-Sheet 3

INVENTOR
H.W. BODE
BY
G. H. Stevenson
ATTORNEY

Patented July 14, 1931

1,814,238

UNITED STATES PATENT OFFICE

HENDRIK W. BODE, OF NEW YORK, N. Y., ASSIGNOR TO BELL TELEPHONE LABORATORIES, INCORPORATED, OF NEW YORK, N. Y., A CORPORATION OF NEW YORK

WAVE FILTER

Application filed April 12, 1930. Serial No. 443,670.

This invention relates to selective circuits of the type known as broad-band wave filters and more particularly to terminating arrangements for such filters.

The principal object of the invention is the improvement of the impedance characteristics of broad-band wave filters. Other objects are the diminution of wave reflection at the terminals of wave filters in selective transmission systems and the improvement of the transmission characteristics of systems employing wave filters.

It is known that, for the full development of their band selective properties, broad-band wave filters should be connected between impedances which substantially match their characteristic impedances at all frequencies within the transmission range. Mis-matching of the impedances results in a loss of efficiency and also in distortion of the transmission characteristic if the degree of mis-matching is not constant. In speech transmission systems the impedances between which a filter is required to operate are generally substantially constant resistances representing, for example, the impedance of a telephone line at high frequencies or the impedance of efficient terminal apparatus. In order that proper impedance matching may be effected and the deleterious effects of wave reflection avoided, it is desirable therefore that the filter should have a characteristic impedance that is substantially a constant resistance throughout its transmission range.

The characteristic impedance of any broad-band filter is necessarily resistive in the transmission band but its value is not constant with frequency and may vary through very wide limits. Improved impedance characteristics have been obtained by the use of the so-called M-type filter sections disclosed in U. S. patent to Zobel 1,538,964, issued May 26, 1925 and by means of special terminating networks such as those of U. S. Patent 1,557,229, issued October 13, 1925. However in the commercial development of carrier and radio telephone systems it has been found that, to make full use of the transmission facilities, wave reflection effects must be almost completely eliminated and for this purpose greatly improved uniformity of the filter impedances is required.

In accordance with this invention an improved terminating network for wave filters is provided, so constructed, as hereinafter described, as to transform the variable impedance of the filter to a substantially uniform resistance matching the line impedance with any desired degree of accuracy.

This correcting network comprises two principal parts. One part consists of a ladder-type network of reactive impedances and has the function of modifying the resistance or the conductance component of the filter impedance. The other part comprises a reactive impedance connected either in series or in shunt at one end of the modifying network, the purpose of this impedance being to neutralize the reactance introduced by the network. The arrangement of the invention may also be regarded as functioning to modify the line or terminal load impedance to conform to the characteristic impedance of the filter or, in general, as an impedance transforming network for converting an impedance having a given form of frequency variation to an impedance of a different prescribed form.

A feature of the arrangement is that it contains no dissipative elements and is therefore effective in producing the desired transformation without energy loss.

In the detailed description which follows the application of the invention in connection with a specific type of broad-band filter, known as the "constant-k" type, is described. It is to be understood, however, that the invention is not limited in its application to this type of filter, but only in accordance with the appended claims. The manner in which its application is extended to other types of filters and to networks for other purposes will be clearly understood from the discussion of the principles involved.

Figure 1:
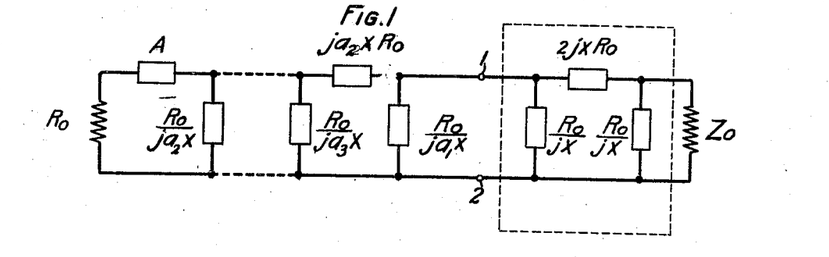
Figs. 1 and 2 are generalized schematics illustrating one form of the invention.

The schematic arrangement of Fig. 1 illustrates the application of the modifying network to a wave filter of the constant-k type for the purpose of transforming its variable impedance to a constant resistance throughout the transmission range. The filter, which is shown enclosed within the dotted rectangle, comprises a single section network having mid-shunt terminations, this being sufficient to indicate the nature of its characteristic impedance. It is terminated by an impedance $Z_0$ which, for the present, will be assumed to have the same value as the characteristic impedance so that it represents an infinite extension of the filter.

The full section impedances of the filter have the values $2jXR_0$ for the series branches and $$\frac{R_0}{2jX}$$

for the shunt branches; for the single mid-shunt section shown the shunt branches have twice the normal impedance, namely $$\frac{R_0}{jX}.$$

The quantity $X$ is a frequency function defining the variation of the reactances. Expressed in terms of the filter cut-off frequencies of a single band filter it has the value $$X = \frac{\frac{f}{f_2} - \frac{f_1}{f}}{1 - \frac{f_1}{f_2}}, \quad (1)$$

where $f_1$ and $f_2$ are the lower and upper cut-off frequencies respectively. The quantity $R_0$ defines the magnitudes of the reactances and is of the nature of a resistance.

The correcting network comprises a series-shunt arrangement of impedances of the same character as the filter branch impedances, but differing in magnitude. The values are denoted by $$\frac{R_0}{ja_1X}, ja_2R_0X \ldots \frac{R_0}{ja_nX},$$

where the coefficients $a_1, a_2 \ldots a_n$ define the magnitudes of the reactances. In addition the network includes a separate reactance denoted by A which functions as a reactance compensator. As shown, this reactance is connected in series, but, in the general case, it may be connected either in series or in shunt. The resistance $R_0$, connected at the outer end of the network represents the terminal impedance to which the filter impedance is to be matched. The impedance of the filter at its terminals 1, 2, is equal to its mid-shunt characteristic impedance, since the connected impedance $Z_0$ is assumed to represent an infinite extension of the filter. It has the value $$\frac{R_0}{\sqrt{1-X^2}},$$

which is resistive within the transmission band, that is, for values of $X$ between plus and minus unity, and is reactive at other frequencies. The resistive value varies from a minimum of $R_0$ for $X$ equal to zero to infinity at the cut-off frequencies. The effect of adding in shunt to the filter the reactance $$\frac{R_0}{ja_1X}$$

is to change the impedance to a value $Z_1$ given by $$Z_1 = \frac{R_0\sqrt{1-X^2}}{1+(a_1^2-1)X^2} - j\frac{Xa_1R_0}{1+(a_1^2-1)X^2}. \quad (2)$$

This equation shows that the resistance variation is modified and that a reactance component has been introduced. The addition of a second branch to the modifying network, namely the series reactance $ja_2R_0X$ will not modify the resistance as given by Equation 2, but, if the admittance of the combination is examined, it will be found that the conductance component has the value $$G_2 = \frac{1}{R_0} \frac{\sqrt{1-X^2}}{1+X^2(a_2^2-2a_2a_1)+X^4(a_2^2a_1^2-a_2^2)} \quad (3)$$

and that an imaginary, or susceptance, component is present.

Each added shunt arm has the effect of further modifying the resistance component of the impedance and introducing a reactance, and each additional series arm produces a modified conductance and susceptance. To make the final impedance resistive it is necessary to neutralize the reactance or the susceptance component. If the impedance modifying portion of the network ends in a shunt branch this requires a compensating reactance in series and if it ends in a series branch a shunt compensating reactance is required to neutralize the susceptance. In the latter case when the susceptance is neutralized the impedance is simply the inverse of the conductance component. It is found that the character of the reactance or the susceptance introduced by the modifying network is such that neutralization can be effected with a high degree of accuracy, at least within the transmission band limits.

It is to be observed that the expressions for the resistance and the conductance in Equations 2 and 3 involve the quantity $$\sqrt{1-X^2}$$

as a numerator together with a denominator which is a polynomial in $X^2$ having coefficients dependent only on the impedance parameters of the modifying network. It may be shown that this form of expression is quite general for networks of the type discussed, regardless of the number of branches used. The conductance or the resistance is always expressible as the ratio of a quantity involving only the connected load impedance to a polynomial in $X^2$, the order of which is the same as the number of branches and the coefficients of which are determined by the network impedances. The convenience of this theorem will be seen in the discussion of the design of the networks.

The relationship stated above is a special case of a general theorem relating to the impedance modifying property of the network of the invention. This general theorem may be stated mathematically as follows. If the terminal impedance to which the network is connected can be expressed in the form $$Z_r = \sqrt{\frac{F_1(X)}{F_2(X)}} + j\frac{G_1(X)}{G_2(X)}, \quad (4)$$

where $F_1(X)$, $F_2(X)$, $G_1(X)$, and $G_2(X)$ are polynomials in $X$, then the impedance or admittance at any point in the network will be expressible as $$Z^{\pm 1} = \frac{F(X)}{D(X)} + j\frac{N(X)}{D(X)}, \quad (5)$$

where $D(X)$ and $N(X)$ are again polynomials in $X$ and where $F(X)$ involves only $F_1(X)$, $F_2(X)$, and $G_2(X)$. In the general case the conductance or the resistance of the modified impedance is thus expressed by the ratio of a quantity determined only by the load impedance to a polynomial in $X$ determined by the network coefficients.

Figure 2:
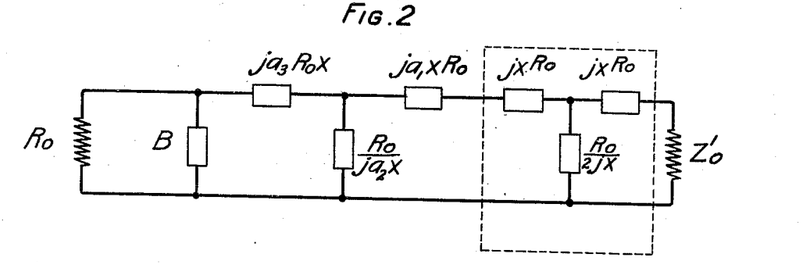

The particular cases of greatest interest are those in which the load impedance is a mid-section terminated "constant-k" filter or is a constant resistance. In Fig. 1 the terminal load consists of a mid-shunt terminated filter. In this case it is preferable that the network should start with a shunt branch adjacent the filter. If the filter is terminated mid-series, however, the modifying network should start with a series branch as illustrated in Fig. 2. In this figure a three branch correcting network is shown, which, since its third branch is in series gives a modified conductance and therefore requires a shunt correcting network, denoted by B, in place of the series network A of Fig. 1. As in the case of Fig. 1 the filter is terminated by an impedance $Z_0$ which is assumed equal to its characteristic impedance.

If the terminal load is a constant resistance the first branch of the modifying network may be either in series or in shunt. In this case, of course the function of the network would be to transform the constant resistance to some presented variable resistance, for example to match a given filter impedance.

In the case of the mid-section terminated constant-k filter the general form for the modified impedance due to the addition of a network of $n$ branches, the last branch being in shunt, is $$Z_n = \frac{R_0\sqrt{1-X^2}}{D_n} + jR_0 X \frac{N_n}{D_n} \quad (6)$$

and for the admittance when the $(n+1)$th branch is added, $$Y_{n+1} = \frac{1}{R_0} \cdot \frac{\sqrt{1-X^2}}{D_{n+1}} + j\frac{X}{R_0} \cdot \frac{N_{n+1}}{D_{n+1}} \quad (7)$$

In these expressions $Z_n$ is, of course, the impedance at the terminals of the $n$th branch and $Y_{n+1}$ the admittance at the terminals of the $(n+1)$th branch. The N's and the D's are polynomials in $X$, of the form $$D_n = 1 + A_1 X^2 + A_2 X^4 + \ldots A_2 X^{2n}$$
$$N_{n+1} = B_0 + B_1 X^2 + B_2 X^4 + \ldots B_n X^{2n}$$

where the A's and the B's are constants dependent on the values of the network elements, that is, upon the coefficients $a_1, a_2$ etc.

The explicit values of the D's and the N's may be obtained in any given case by direct computation, but they are more easily obtained by use of the following relationships which hold for all values of $n$, $$N_{n+1} = -(a_{n+1} D_n + N_n), \quad (8)$$
$$D_{n+1} = a^2_{n+1} X^2 D_n + 2a_{n+1} X^2 N_n + D_{n-1} \quad (9)$$

In the design of a network to transform the filter impedance to a substantially constant resistance throughout the band the first step is to choose the coefficients of the denominator polynomial in the expression for the resistance or the conductance so that the polynomial closely approximates the value $$\sqrt{1-X^2}$$

for values of $X$ between $-1$ and $+1$. The resistance value will then be substantially equal to $R_0$ or the conductance substantially equal to the reciprocal of $R_0$. The second step is the determination of the impedance coefficients $a_1, a_2$ etc. from the constants of the polynomial. This step is straightforward, but may be rather cumbersome. It is always possible, however, with the help of Equations 8 and 9 to set up a sufficient number of equations relating the $a$'s to the polynomial constants and these equations may be solved by standard analytical or graphical methods.

The choice of the constants of the denominator polynomial is to a certain extent arbitrary since a variety of values can be found which will give different types of approximation to the quantity
$$\sqrt{1-X^2}.$$
The choice may be rationalized, however, if the form of approximation is stipulated. For example it may be required that,

*a* The approximation shall be the closest possible for small values of X; or

*b* The deviation from constancy shall be such that the sum of the squares of all the deviations shall be a minimum; or

*c* That the maximum departure within the operating range shall be a minimum.

Conditions *a* and *b* lend themselves most readily to analytical investigation, although in certain cases the values required by condition *c* may also be determined.

Figure 3:
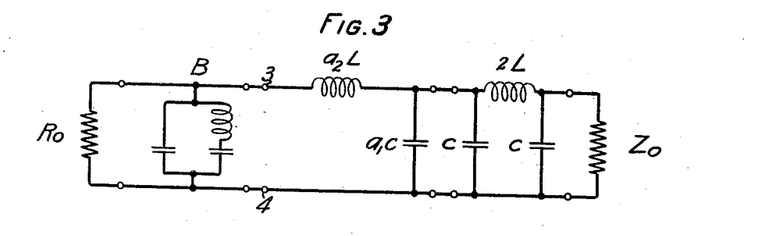
Figs. 3 and 4 show particular forms of the invention as applied to a low-pass filter.

The carrying out of the procedures outlined above will be elucidated by the following detailed computations of networks involving 2 and 3 branches. For simplicity the design of correcting networks for a low-pass filter will be considered. The case of a two branch correcting network is illustrated in Fig. 3 in which as in Figs. 1 and 2 the filter is indicated by a single section terminated by an impedance $Z_0$ equal to its characteristic impedance. The series branch impedances of the filter are constituted by inductances $2L$ and the shunt branches by capacities $2C$, mid-shunt termination giving end branches of capacity $C$. The relative values of $L$ and $C$ are such that
$$\sqrt{\frac{L}{C}} = R_0.$$
The modifying network comprises a shunt capacity $a_1C$ adjacent the filter and a series inductance $a_2L$. The susceptance annulling network B is connected in shunt and is shown in its preferred form.

The conductance at the terminals 3, 4 is given by
$$G_2 = \frac{1}{R_0} \frac{\sqrt{1-X^2}}{1+A_1X^2+A_2X^4}, \quad (10)$$
where
$$A_1 = a_2^2 - 2a_1a_2 \quad (11)$$
and
$$A_2 = a_2^2(a_1^2 - 1) \quad (12)$$
in accordance with Equation 3.

Equations 11 and 12 give explicit formulae for $a_1$ and $a_2$ in terms of $A_1$ and $A_2$ as follows
$$a_1 = \frac{1 \pm \sqrt{1+A_1+A_2}}{\sqrt{(1\pm\sqrt{1+A_1+A_2})^2 - A_2}} \quad (13)$$
and
$$a_2 = \sqrt{(1\pm\sqrt{1+A_1+A_2})^2 - A_2} \quad (14)$$
the upper of the alternative signs being preferred.

As already stated the choice of the coefficients $A_1$ and $A_2$ may be made in different manners according to the type of approximation to constancy of the conductance that is desired.

The requirement that the conductance shall be most uniform for small values of $X$ is met by expanding the quantity
$$\sqrt{1-X^2}$$
as a series and identifying the first three terms with the denominator polynomial. Since
$$\sqrt{1-X^2} = 1 - \frac{1}{2}X^2 - \frac{1}{8}X^4 - \frac{1}{16}X^6 \ldots$$
this procedure gives
$$A_1 = -.5$$
$$A_2 = -.125$$
and, by Equations 13 and 14
$$a_1 = .97679$$
$$a_2 = 1.65068 \quad (15)$$

The determination of $a_1$ and $a_2$ gives the complete design of the conductance modifying network, the numerical values of the inductances and the capacities following immediately from the given values of the filter impedances.

The requirement that the maximum departure from the desired uniform value shall be a minimum imposes a relationship between $A_1$ and $A_2$ which may be shown to be
$$(A_1^2 + 4A_2)^2 + \frac{27}{16}\frac{A_2}{1+A_1+A_2} = 0 \quad (16)$$
when the operating range is taken as nine tenths of the band width. The corresponding values of the parameters are found to be
$$A_1 = -0.40$$
$$A_2 = -0.366$$
$$a_1 = .93143$$
$$a_2 = 1.59296 \quad (17)$$

The choice of $A_1$ and $A_2$ to give the least square error throughout the operating range involves the simulation of
$$\sqrt{1-X^2}$$
by the Legendrian functions of $X$, a process analogous to the simulation of a periodic function by a Fourier series. For a discussion of the Legendrian functions and of this method of simulation, reference is made to Fourier Series and Spherical Harmonics, Byerly, 1893, p. 151. The Legendrian functions of even order from zero upwards are used, the number of terms in the approximation series being the same as in the denominator polynomial. This gives, in the general case,
$$\sqrt{1-X^2} = B_0P_0(X) + B_2P_2(X) + B_4P_4(X) + \cdots$$
$$(18)$$
where $P_0(X)$, $P_2(X)$ etc. are the Legendrian functions, and where the B's are numerical coefficients given by $$B_r = (2r+1)\int_0^{+1}\sqrt{1-X^2}P_r(X)dX \quad (19)$$

After the B coefficients have been determined by means of Equation 19, the approximation of $$\sqrt{1-X^2}$$

given by Equation 18 can be transformed to a polynomial in $X^2$ which may be identified with the denominator polynomial thereby giving the desired values of $A_1$ and $A_2$ etc. from which the impedance parameters are found. For the case $n=2$ the procedure gives $$G_2 = \frac{.99}{R_0}\frac{1-.3256X^2-.4884X^4}{1+A_1X^2+A_2X^4} \quad (20)$$

from which $$A_1 = -0.3256$$
$$A_2 = -0.4884$$
$$a_1 = 0.8986$$
$$a_2 = 1.5428 \quad (21)$$

If $G_2$ had exactly the value given by this equation the identification of the two polynomials would give a system having the constant conductance $$\frac{.99}{R_0}.$$

To make the conductance match the value $$\frac{1}{R_0}$$

the filter and its correcting network should therefore be given a higher initial conductance in the ratio 1.011. This requires a change in the values of the inductances and capacities of the filter branches, which instead of having values such that $$\sqrt{\frac{L}{C}}=R_0$$

should have values such that $$\sqrt{\frac{L}{C}}=.99R_0$$

Figure 5:
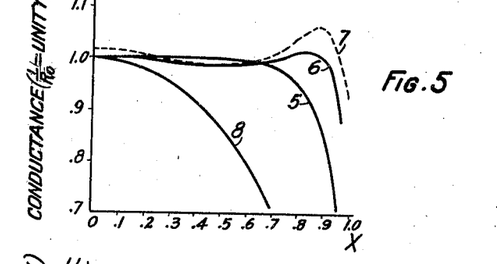
Figs. 5 and 6 are characteristic curves corresponding to the circuits of Figs. 3 and 4.

The conductance values obtained by means of networks designed in accordance with the three methods described above are shown by the curves of Fig. 5, in which the ordinates represent the ratio of the conductance $G_2$ to the value $1/R_0$ and the abscissæ represent the values of the frequency function $X$. Curve 5 corresponds to the case in which the coefficients $A_1$ and $A_2$ are identified with the coefficients of the binomial expansion; curve 6 corresponds to the condition that the maximum variation in the range $X=0$ to $X=0.9$ shall be a minimum; and curve 7 to the requirement that the sum of the squares of the departures shall be a minimum. For comparison curve 8 showing the conductance of the uncorrected filter is also given.

Figure 4:
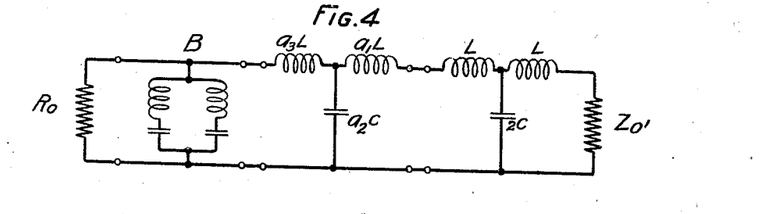

The design procedure in the case of the three branch correcting network shown in Fig. 4 is precisely the same as for the two-branch network discussed above, although the computation is more cumbersome on account of the number of elements involved. The filter in this case is terminated mid-series and the third branch of the correcting network is also in series. The network, as in Fig. 3, gives a conductance correction and the susceptance neutralizing branch B is in shunt. For the different types of correction the impedance parameters are found to have values as follows 1. Binomial expansion of $\sqrt{1-X^2}$ $$A_1=-0.5, \quad a_1=0.99693,$$
$$A_2=-0.125, \quad a_2=1.96227,$$
$$A_3=-0.625, \quad a_3=1.62715. \quad (22)$$

2. Minimum departure in the range $$X=0 \text{ to } X=.975$$
$$A_1=-0.76148, \quad a_1=0.94609,$$
$$A_2=+0.87082, \quad a_2=1.94049,$$
$$A_3=-0.97471, \quad a_3=1.57080. \quad (23)$$

3. Least square error in range $$X=0 \text{ to } X=1$$
$$A_1=-0.6461, \quad a_1=0.9597,$$
$$A_2=+0.4958, \quad a_2=1.924,$$
$$A_3=-0.7162, \quad a_3=1.565. \quad (24)$$

In the last case the filter is given an initial conductance $$\sqrt{\frac{C}{L}}=\frac{.9948}{R_0}$$

to effect the best matching to a resistance $R_0$.

Figure 6:
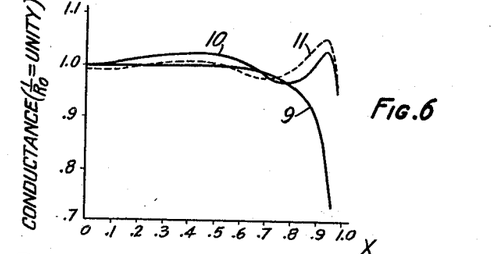

Fig. 6 shows the conductances obtainable with networks having the constants given above. The ordinates and the abscissæ represent the same quantities as in Fig. 5. Curve 9 corresponds to case 1 above, curve 10, to case 2, and curve 11 to case 3. It is to be observed that the resulting characteristics in cases 2 and 3 are very similar and that the elements have about the same values in each case. It appears from this that the more direct design procedure of case 3 will give satisfactory results in all cases.

The foregoing designs have been carried out for conductance correcting networks, that is for networks ending in series branches. The values obtained, however, apply also to resistance correcting networks, in which the last branch is in shunt as shown in Fig. 1. The coefficients $a_1, a_2, a_3$ etc. in every case are simply applied in their order to the respective branches counting from the filter, appearing as divisors in the shunt reactances and as multipliers in the series reactances.

Figure 7A:
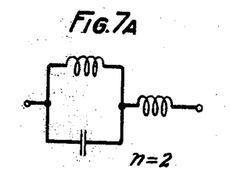
Figs. 7a, 7b, 7c, and 8a, 8b, 8c show preferred forms of reactance and susceptance neutralizers for use in the circuits of Figs. 3 and 4.
Figure 7B:
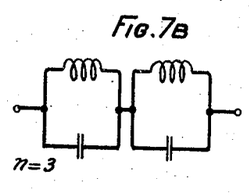
Figure 7C:
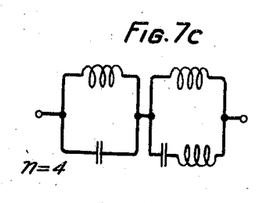
Figure 8A:
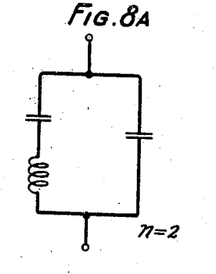
Figure 8B:
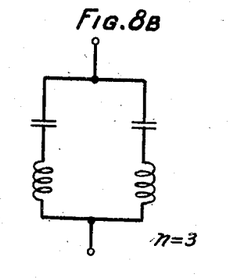
Figure 8C:
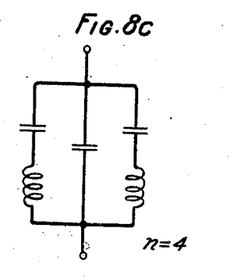

The completion of the network design requires the determination of the reactance or susceptance neutralizing network. No explicit formulæ can be given for the calculation of this network since the reactance or the susceptance to be neutralized varies in such a manner that exact compensation at all frequencies is not possible by any type of passive network. However, within the transmission range of the filter, the neutralization can be effected approximately with any desired degree of precision. In this range the reactance, or the susceptance, is negative, has zero value at zero frequency and increases continuously with frequency at an increasing rate for higher frequencies. To a first approximation the reactance may be neutralized by a single inductance element connected in series and the susceptance by a condenser connected in shunt, but if accurate compensation is desired more complex impedances are necessary. Figs. 7a, 7b, and 7c, show the preferred types of reactance correctors for use with resistance modifying networks of 2, 3, and 4, branches respectively and Figs. 8a, 8b, and 8c show the preferred types of susceptance correctors for use with corresponding conductance modifying networks. In each case the resonance and anti-resonance frequencies occur above the transmission band limit.

Figure 9:
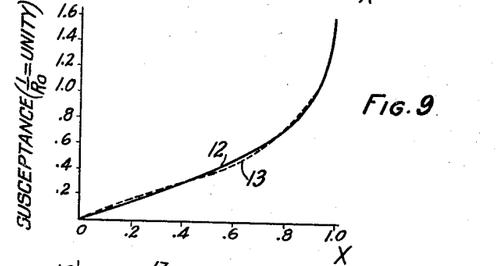
Fig. 9 illustrates the operation of the neutralizing networks.

The design procedure involves a point to point calculation of the reactance or susceptance by means of Equations 6 and 7, plotting the values to show the variation within the transmission range and then, by successive trials, adjusting the constants of the appropriate correcting impedance to obtain the desired degree of compensation. Instead of successive trials, an analytical expression may be written for the impedance or admittance of the selected correcting network and the coefficients determined by equating this to the computed reactance or susceptance at the requisite number of frequencies. Fig. 9 illustrates the susceptance correction for the network illustrated in Fig. 4 when the coefficients have the values given by Equations 23. The continuous line curve 12 represents the susceptance, with sign reversed, at the terminals of the conductance controlling network and the dotted curve 13 represents the susceptance of an annulling network of the type shown in Fig. 8b.

Figure 10A:
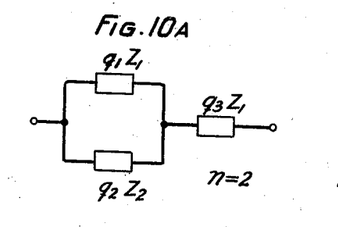
Figs. 10a, 10b, and 10c, are generalized schematics of the preferred forms of neutralizing networks.
Figure 10B:
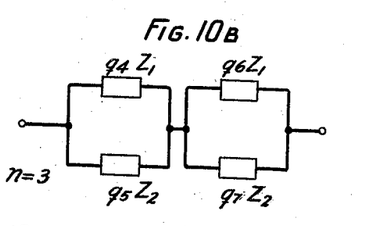
Figure 10C:
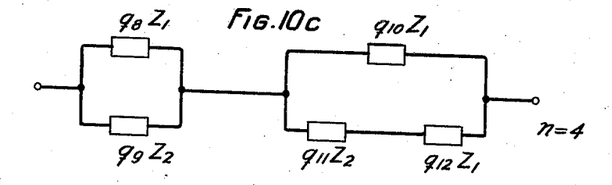

The design method outlined above is applicable not only to low-pass filters, but also to high-pass and band-pass filters and the branch impedance coefficients given in the various equations can be applied directly in these cases. In all cases the structure of the resistance or conductance modifying network is similar to that of the filter with which it is connected, the impedances of the branches varying in magnitude in the same way as in the low-pass filter illustrated. The preferred type of reactance or susceptance correcting network is also related structurally to the filter branch impedances. The general types of reactance correctors for resistance modifying networks of 2, 3, and 4, branches respectively are illustrated in Figs. 10a, 10b, and 10c. In these figures the symbols $Z_1$ and $Z_2$ in conjunction with numerical coefficients $q_1$, $q_2$, etc. to designate impedances of the same type as and proportionally related to the series and shunt branch impedances respectively of the filter.

Figure 11:
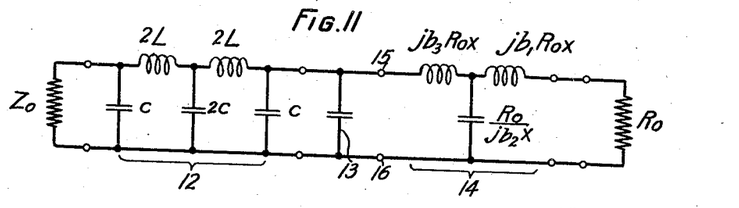
Fig. 11 shows one example of a modified form of the invention.

In a modified form of the invention the reactance or susceptance neutralizing network is connected between the filter and the impedance modifying network instead of adjacent the terminal load. The resistance modifying network is of the same form as those already described, but it is found that the reactance or susceptance controlling network may be of much simpler form. One example of the modified form of the invention is illustrated in Fig. 11 which shows a low-pass filter 12, terminated at one end as in Figs. 3 and 4 by an impedance $Z_0$ equal to its characteristic impedance, and coupled to a resistance $R_0$ at the other end through a conductance modifying network 14 and a susceptance neutralizer 13. In this case the susceptance is neutralized by a simple capacity connected in shunt. The particular case illustrated is that of a mid-shunt terminated filter and a modifying network adapted to give a conductance matching that of the filter. The filter impedances are such that the mid-shunt admittance is equal to $$\frac{1}{R_0}\sqrt{1-X^2}.$$

The design formulæ for the network 14 are developed by procedure which is the converse of that already described. Instead of starting with the filter impedance and modifying it to approximate to a constant resistance, the resistance terminal load $R_0$ is made the starting point and the network is designed to transform this to approximate to the filter impedance. The practical result is about the same in both cases, but, as the result of the different location of the susceptance corrector, the modified form exhibits a different form of attenuation characteristic outside the transmission band.

The formula for the admittance looking into the modifying network at terminals 15, 16 is readily found by the application of the theorem expressed in Equations 6 and 7 and the explicit form of the polynomials may be determined by means of Equations 8 and 9 as in the previous case. For the case illustrated, in which the modifying network has three branches, the conductance is given by $$G=\frac{1}{R_0}\frac{1}{1+B_1X^2+B_2X^4+B_3X^6} \quad (25)$$

where $B_1$, $B_2$ etc. are numerical constants dependent on the impedance parameters and X has the same significance as before.

Expressed in terms of the impedance parameters the B coefficients have the following values $$B_1 = (b_1+b_2)^2 - 2b_2b_3$$
$$B_2 = b_2b_3[b_2b_3 - 2b_1(b_1+b_3)]$$
$$B_3 = b^2_1 b^2_2 b^2_3$$

The requirement that the conductance shall equal the mid-shunt conductance of the filter is expressed by $$\frac{1}{R_0}\sqrt{1-X^2} = \frac{1}{R_0}\frac{1}{1+B_1X^2+B_2X^4+B_3X^6}$$

or $$\frac{(1-X^2)^{-1/2}}{1+B_1X^2+B_2X^4+B_3X^6} = 1 \quad (26)$$

The values of the B's, and therefore the values of $b_1$, $b_2$, etc., to approximate this relationship may be found as before by taking the first four terms of the binomial expansion of $(1-x^2)^{-1/2}$ and identifying the coefficients with the coefficients of the corresponding terms of the denominator. A better approximation, however, is obtained by equaling the numerator and denominator at three values of X distributed through the transmission band. In this way a set of three numerical equations for the B's is obtained from which the B's are readily found. Taking the values of X as $$X_1 = .55,$$
$$X_2 = .75,$$

and $$X_3 = .89,$$

the following values are found for the B coefficients:

$$B_1 = .9114,$$
$$B_2 = -1.8488,$$
$$B_3 = 3.2823,$$

and for the impedance parameters $$b_1 = .6733,$$
$$b_2 = 1.4662,$$
$$b_3 = 1.8354. \quad (27)$$

Figure 12:
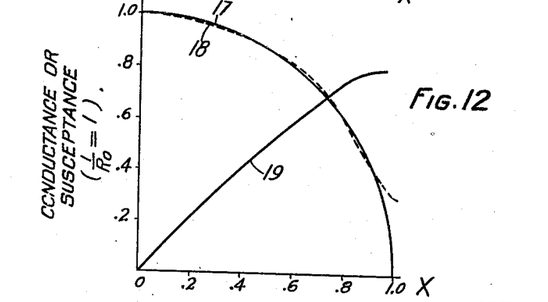
Fig. 12 illustrates the operation of the device of Fig. 11.

The values of the conductance and susceptance obtained with a network of the type shown in Fig. 11 having the impedance coefficients given above are shown by the curves of Fig. 12 in which the abscissæ represent the values of X and the ordinates the conductance and susceptance. Curve 17 represents the mid-shunt conductance of the filter; curve 18 the conductance at the terminals of the modifying network; and curve 19 the susceptance with sign reversed. From the character of curve 19 it is evident that the susceptance can be neutralized throughout practically the whole transmission band by a simple capacity such as 13 connected in shunt between terminals 15 and 16.

The network of Fig. 11 is shown having a series branch adjacent the resistance $R_0$, but it is immaterial whether it starts with a shunt or a series branch and the impedance coefficients obtained from the design calculations are simply applied to the branches in order counting from the resistance. If the network is to be used in connection with a mid-shunt filter as shown, it is preferable that the last branch adjacent the filter should be a series branch, the susceptance compensator being then in shunt. If the filter is mid-series terminated the converse arrangement is to be preferred, the last branch being in shunt and the reactance compensator in series.

In the foregoing discussion it has been assumed that the filter to which the modifying network of the invention is connected is terminated at its other end by an impedance $Z_0$ which represents an infinite extension of the filter. It is manifest that a very close approximation to this condition is obtained by the use of an additional modifying network in combination with a constant resistance. The filter has also been assumed to be of the constant-k type, but this restriction need only apply to its end sections and the structure may include various so-called "suppression" sections combined in the manner indicated by U. S. Patent 1,636,713 of July 26, 1927 to G. C. Reier and U. S. Patent 1,636,737 of the same date to E. Dietze. Other types of filter may also be used, for example the "lattice" or the "bridged-T" types disclosed in U. S. Patents 1,600,290 of September 21, 1926 and 1,611,916 of December 28, 1926 respectively, provided these are so proportioned as to have the same characteristic impedances as the corresponding constant-k wave filter.

The modifying network of the first type, Figs. 1 to 10, has properties similar to suppression type filter sections due to the resonances of the susceptance or reactance neutralizer. These resonances occur at frequencies outside the band limits, generally fairly close to the cut-off frequencies, and have the effect of sharpening the discrimination between the transmission and the attenuation ranges. The networks of the type shown in Fig. 11 do not possess this property and are therefore adapted to be used in systems where resonance of the terminating impedance is undesirable.

In the claims the term constant-k prototype is used to define the ladder type filter corresponding in its selectivity to a specified filter and having its series and its shunt impedances of inverse types such that their product is a constant quantity invariable with frequency.

What is claimed is:

1. In combination, a broad-band wave filter, a resistive load impedance therefor, and an impedance correcting network connected between the terminals of said filter and said load impedance, said correcting network comprising a plurality of impedance branches disposed in series and shunt relation and proportioned with respect to the characteristic impedance of the filter to equalize the resistance component thereof to a substantially constant value throughout the transmission band and an additional reactive impedance for neutralizing the reactance introduced by the resistance correcting branches.

2. In combination, a broad-band wave filter and a terminal network therefor adapted to simulate the impedance of an infinite extension of the filter, said network comprising a terminal resistance, a plurality of reactive impedances forming a series-shunt artificial line and proportioned with respect to the characteristic impedance of the filter to equalize the resistance component thereof to a substantially constant value throughout the transmission band and an additional reactive impedance for neutralizing the reactance introduced by the resistance equalizing branches.

3. A combination in accordance with claim 2 in which the reactance neutralizing impedance is connected between the filter and the resistance equalizing impedances.

4. In combination a broad-band wave filter comprising a plurality of similar sections having impedance branches disposed in series-shunt relationship, a resistive terminal load for said filter, and an impedance transforming network connected between said filter and said load, said network comprising an artificial line having a plurality of impedances disposed in series-shunt relation, the series and the shunt impedances of said network being respectively related to the series and shunt impedances of said filter by numerical factors different from unity whereby the resistance of the filter is substantially equalized to the resistance of the terminal load throughout the transmission band.

5. In combination a broad-band wave filter having a characteristic impedance equal to that of its constant-k prototype, a resistive terminal load, and an impedance transforming network connected between said filter and said load, said network comprising an artificial line having a plurality of impedances disposed in series-shunt relation, the series and the shunt impedances of said network being respectively related to the series and the shunt impedances of the constant-k prototype of said filter by numerical factors and having magnitudes proportioned substantially as described whereby the impedance of the filter is substantially equalized to the resistance of the terminal load throughout the transmission band.

In witness whereof I hereunto subscribe my name this 11th day of April, 1930.

HENDRIK W. BODE.